INVENTOR
Jason L. Saunderson
BY Morse & Altman
ATTORNEYS

United States Patent Office 3,090,278
Patented May 21, 1963

3,090,278
AUTOMATIC MEANS FOR ALIGNING
SPECTROMETER COMPONENTS
Jason L. Saunderson, Lexington, Mass., assignor to Baird-Atomic, Inc., Cambridge, Mass., a corporation of Massachusetts
Filed Mar. 22, 1960, Ser. No. 16,690
2 Claims. (Cl. 88—14)

The present invention relates to spectrum analysis and, more particularly, to spectrometers of the so-called "direct reading" type, which automatically indicate the chemical composition of a specimen by determining the intensity distribution of radiation of characteristic wavelengths emitted by the specimen under excitation.

By way of example, a typical direct reading spectrometer comprises an entrance slit that transmits radiation from an electrically excited specimen, a diffraction grating that forms a spectrum from radiation so transmitted, and a plurality of exit slits that transmit components of specimen radiation of preselected wavelengths to photocells in order to determine the differing intensities at these wavelengths. In such a spectrometer, the spacial relationships among the entrance slits, the grating and the exit slits are so critical that minor changes in ambient temperature, for example, may cause their misalignment and, in consequence, a spectrum shift capable of introducing errors into the determination of intensities.

It has been proposed that the automatic correction of any such misalignment be effected by an automatic servo system that is photoelectrically controlled by what may be termed "monitor radiation." In accordance with the present invention, this servo-system utilizes this monitor radiation in the form of a component of the specimen radiation. The construction is such as to omit auxiliary radiation that might complicate the reading of like radiation in the specimen or reduce the versatility of the spectrometer. The operation is such that misalignment among the grating and the entrance and exit slits for the components of specimen radiation under analysis is accompanied inherently by analogous misalignment among the grating and the entrance and exit slits for the component of specimen radiation serving a monitor function.

Accordingly, the primary object of the present invention is to provide a spectrometer having both reading and monitoring systems for receiving components of specimen radiation in the performance of both analyzing and monitoring functions.

Other objects of the present invention will in part appear hereinafter.

The invention accordingly comprises the apparatus possessing the features, properties and relation of components that are exemplified in the following detailed disclosure, the scope of which will be indicated in the appended claims.

Figure 1:
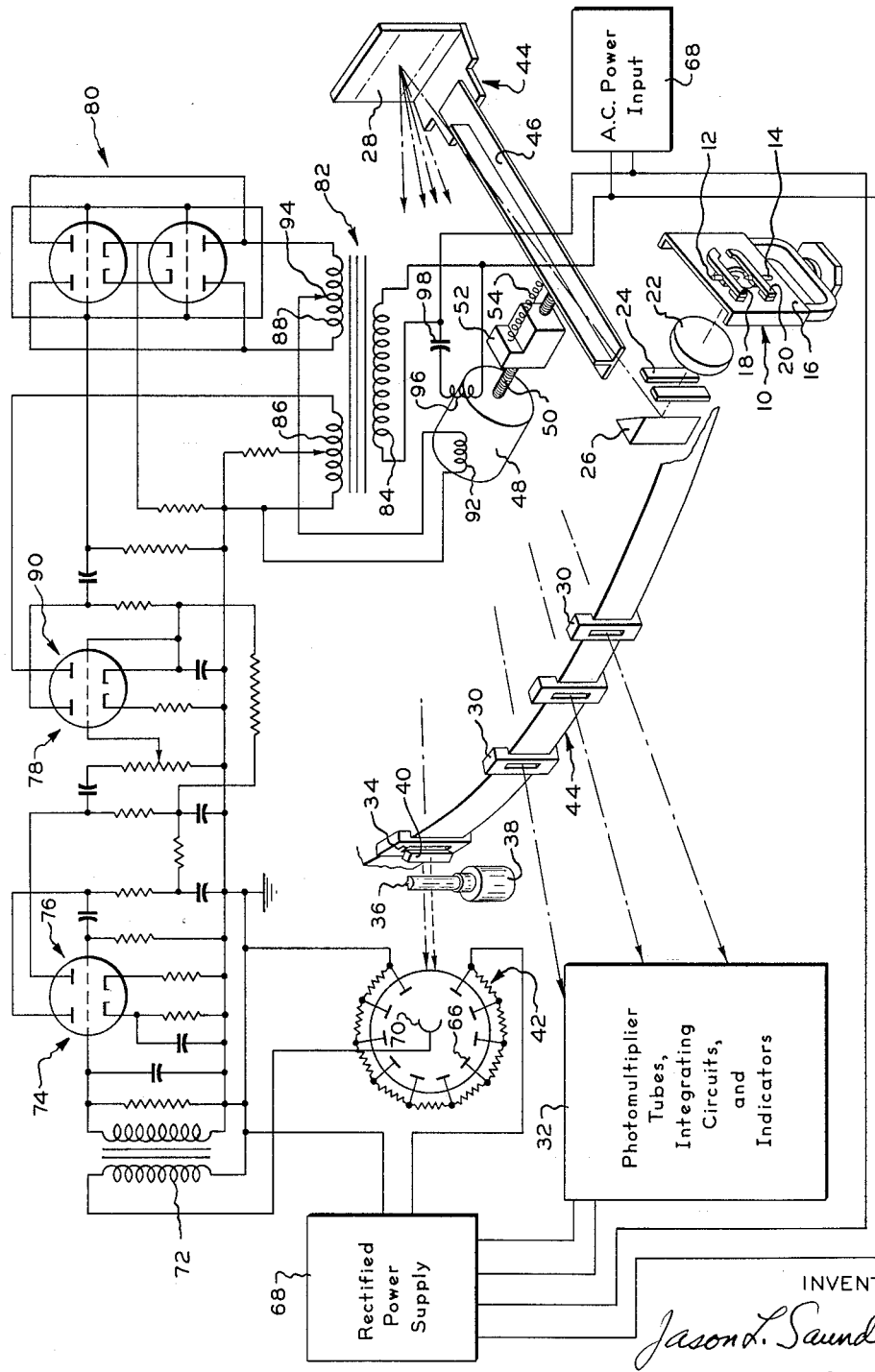
Figure 2:
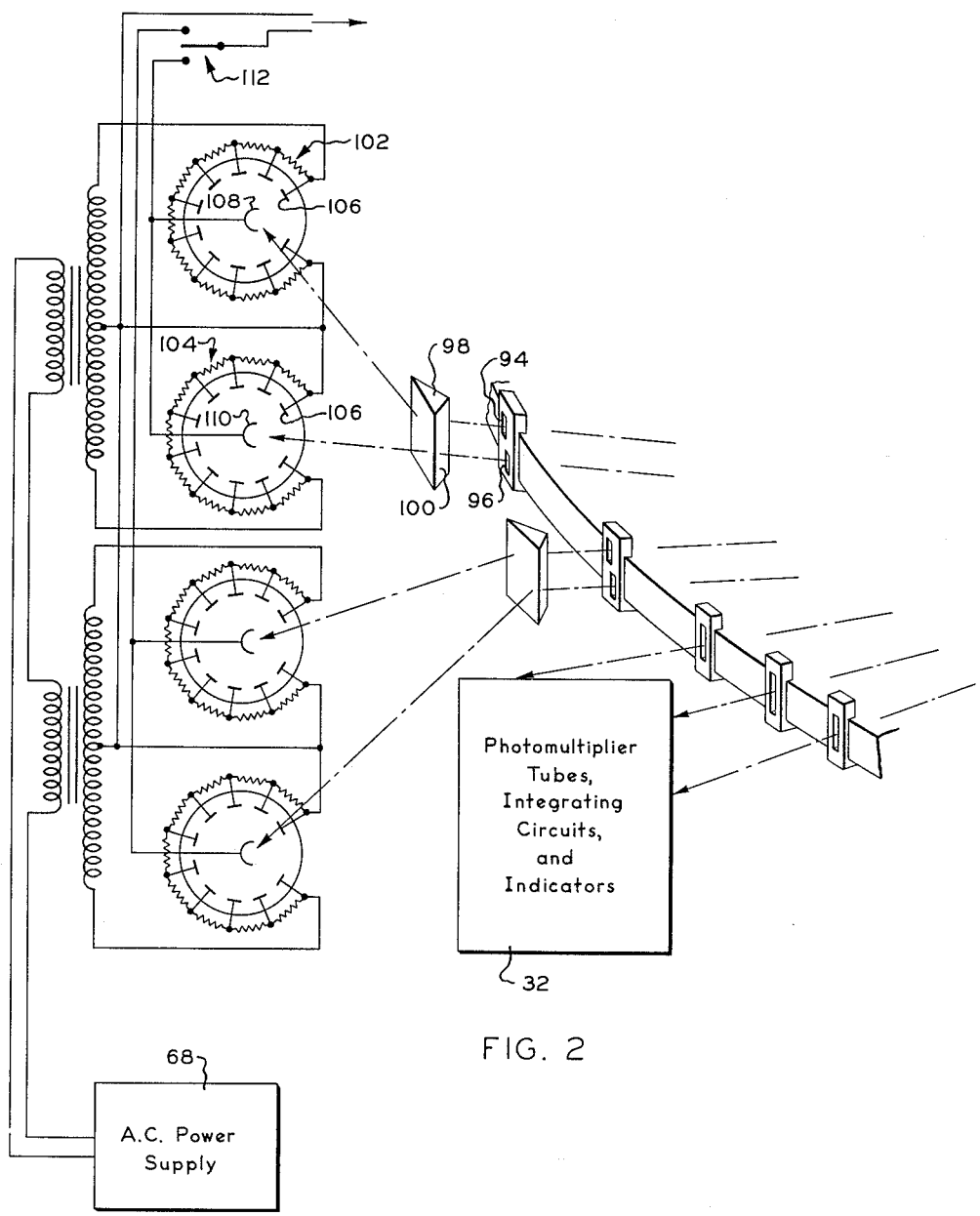

For a fuller understanding of the nature and objects of the present invention, reference should be had to the following detailed description taken in connection with the accompanying drawings wherein:

FIG. 1 is a partially schematic, partially perspective diagram of a system embodying the present invention, and FIG. 2 is a partially schematic, partially perspective diagram of another system embodying the present invention.

The mechanical components of the spectrometer of FIG. 1, in operation, are enclosed within a housing that shields its interior from ambient radiation capable of affecting the system now to be describeed. This system serves to indicate the chemical composition of a specimen by determining the intensity distribution, at selected wavelengths, of radiation emitted by the specimen under excitation in an arc mount assembly 10. In conventional fashion, arc mount assembly 10 comprises a pair of electrodes 12 and 14, for example, in the form of two pins composed of the specimen material. Electrodes 10 and 14 are retained in predetermined relative axial positions on a mount 16 by a pair of clamps 18 and 20. Associated with arc mount assembly 10 is a circuit not shown for generating a suitable voltage across the gap between the inner ends of electrodes 12 and 14 in order to produce an electrical discharge that is accompanied by the characteristic radiation from the specimen. The gap between the inner ends of electrodes 12 and 14 is imaged by a lens 22, a slit 24 and a mirror 26 toward a concave diffraction grating 28 in order to produce a spectrum. Preselected portions (which may be thought of loosely as preselected lines) of this spectrum are directed through respective exit slits 30 toward respective photomultiplier tubes in association with appropriate integrating circuits (not shown).

In order to minimize even slight disturbances of the spacial relationships among the various aforementioned components, they are mounted on a sturdy A-shaped frame of the type shown in patent application Ser. No. 611,497, filed on September 24, 1956, now Patent No. 2,937,561, issued May 24, 1960, in the names of Jason L. Saunderson and Eliot Du Bois, for "Spectroscopic Apparatus." This frame has intersecting longitudinal legs and short cross pieces constructed from heavy gauge channel stock. Nevertheless, because of the relatively great distance between the grating at one end of this frame and the entrance and exit slits at the other end, small temperature changes tend to disorient the grating with respect to the entrance and exit slits. In accordance with the present invention, proper orientation is ensured by an automatic servo system now to be described.

This servo system is photoelectrically controlled by monitor radiation from arc mount assembly 10 in the form of that component of specimen radiation by which the grating forms the so-called "central image" of entrance slit 24. It is known that the central image is formed by the grating in such a way that the angle of deflection is equal to the angle of incidence. Accordingly, this servo system includes an exit slit 34 that is positioned to receive a beam from grating 28 having an angle of deflection that is equal to the angle of incidence on grating 28 of the beam of specimen radiation from entrance slit 24.

Associated with slit 34 is a chopper including a half rod 36, which is driven by a synchronous motor 38, and a prism 40, which is diamond shaped in cross-section. Normally, the servo system is adjusted so that when the grating is properly oriented, the two beams as shown in dotted line are transmitted alternately in equal intensity to a photomultiplier tube 42. But when the grating becomes improperly oriented, more of one of the beams and less of the other is transmitted to the photomultiplier tube 42. Here the resulting imbalance operates to re-orient the grating by means of the circuit and mechanism to be described below in reference to FIG. 1.

The mechanical components of the servo system include a mount, generally designated by 44, which carries grating 28 in substantially fixed position with respect to slits 30. Control of the grating orientation about a vertical axis is exercised by an elongated lever 46, one end of which is secured to mount 44. Servo motor 48 drives a shaft 50 on which rides an internally threaded block 52. Block 52 rides along a keyway in one direction or the other in response to rotation of the shaft. A coil spring 54, connected between block 52 and lever 46, exerts shock free force on lever 46. In order to maintain proper orientation of the grating, servo motor 48 is controlled by the servo circuit to be described below.

As indicated above, the two beams of monitor radiation received by photomultiplier tube 42 are such that there is one orientation of the beams at which their intensities are equal. If the beams are in any other orientation, either the radiation transmitted through one or the radiation transmitted through the other will be greater in intensity. Photomultiplier tube 42 includes dynodes 66 under steady voltages applied by a rectified power supply 68 and a collector anode 70. In response to the two beams photomultiplier tube 42 generates a succession of electrical pulses which are equal in magnitude when the beams are properly oriented. Collector anode 70 is connected through an input transformer 72 to three amplifier stages 74, 76 and 78 and a push-pull power stage 80. These stages are energized by power supply 68 through a transformer 82 having a primary winding 84. A pair of secondary windings 86 and 88 supply, respectively, a rectifier stage 90 that polarizes amplifier stages 74, 76 and 78 and power stage 80. One winding 92 of servo motor 48, which is of the split phase induction type, is connected between an appropriate intermediate point 94 of a secondary winding 88 to ground. The other winding 96 is connected to power supply 68 through a capacitor 94 which shifts the wave form in winding 96 into a 90° out of phase relationship with respect to the wave form in winding 92.

The operation of the circuit is such that when the alternate pulses generated by photomultiplier tube 70 are equal in magnitude, the wave form in windings 92 and 96 will be a succession of pulses of equal amplitude, these pulses corresponding in time with the positive and negative half cycles of the input power wave form. The rotor of the motor is thereby subjected to successively equal and opposite forces with the result that it remains stationary. However, when the alternate pulses from photomultiplier tube 42 are unequal in magnitude, a similar inequality will exist in the wave form of winding 92 and the pulses of greater amplitude will correspond with either the positive or negative half cycles of the power input wave form. Because the wave form in winding 96 is 90° out of phase with respect to the power input wave form, the rotor of the said servo motor 48 will rotate. The direction of rotation will be determined by whether the pulse of greater amplitude in winding 92 coincides with the positive or negative half cycle of the power input wave form. This direction is determined by whether the beam transmitted through one half of prism 40 or the beam transmitted through the other half of prism 40 is of greater intensity.

An alternative servo-system, shown schematically in FIG. 2, is controlled by monitor radiation in the form of a selected single beam of specimen radiation that is diffracted by the grating. Normally, in the analysis of a particular alloy, for example, the base metal is characterized by many spectrum lines, one of which is characteristic of the base metal. This line is employed as an internal standard, in reference to which the intensities of the other lines are determined. In accordance with the present invention another of these spectrum lines may be employed as the monitor component. Thus in the case of an iron base alloy, one iron line may be employed as the internal standard and another iron line may be employed in the monitoring system. In order to render this system as versatile as possible, a switching control is provided in order to enable the selection of one of several different spectrum lines as the monitor radiation.

The servo-system, shown schematically in FIG. 2, is controlled by monitor radiation in the form of a single beam of specimen radiation that is diffracted by the grating. As shown, the entrance optics for radiation from the excited specimen, the mechanical arrangement for mounting and controlling the orientation of the grating, the exit optics for radiation from the excited specimen, and the circuitry for energizing the servo-motor all are similar to their counterparts in FIG. 1. Here, however, the selected beam of specimen radiation, after being diffracted by the grating, is directed through a pair of offset slits 94 and 96. The resulting two beams then are reflected by a pair of mirrors 98 and 100, respectively, to a pair of photomultiplier tubes 102 and 104. The dynodes 106 of photomultiplier tube 102 are supplied with alternating voltage that is 180° out-of-phase with respect to the voltage supplied to the dynodes 106 of photomultiplier tube 104. The collector anodes 108 and 110 of photomultiplier tubes 102 and 104, respectively, are applied in common to the input transformer of the amplifier circuit described above in reference to FIG. 1. The power supplied to the photomultiplier tubes is of the same phase and frequency as the power supplied to the amplifier circuit. Since each photomultiplier tube is sensitive to radiation only when its dynodes are negative with respect to its anode, the signal applied to the transformer is of the same pulsating character as the signal applied by the single photomultiplier tube described above. A switch 112 enables switching from one monitor radiation position to another as desired in correspondence with the base metal of the particular alloy under analysis.

The present invention thus provides a simple but effective servo system for automatically controlling the orientation of a grating or the like with respect to input and output optical components spaced therefrom. Alternative systems, similar in principle, are shown in Patent No. 2,837,959, issued on June 10, 1958, in the name of Jason L. Saunderson and Eliot Du Bois, for "Means for Aligning Spectroscopic Components."

Since certain changes may be made in the above disclosure without departing from the scope of the invention herein involved, it is intended that all matter contained in the above description or shown in the accompanying drawing shall be interpreted in an illustrative and not in a limiting sense.

What is claimed is:

1. Spectroscopic apparatus comprising source means for exciting a chemical sample to emit radiation from a single location, entrance slit means for passing said radiation from said source means, diffraction grating means for diffracting said radiation from said entrance slit means into a distribution of spectrum lines of which a plurality of spectrum lines indicate the composition of the sample and a selected spectrum line serves as a reference, a plurality of exit slit means for passing said plurality of said spectrum lines, a plurality of indicator photodetecting means for receiving said plurality of spectrum lines, a selected exit slit means for passing said selected spectrum line, a reference photodetecting means for receiving said selected spectrum line in order to produce a signal, said entrance slit means, said diffraction grating means, said plurality of exit slit means and said selected exit slit means being geometrically related and oriented with repsect to each other to provide coincidence of said plurality of spectrum lines with said plurality of exit slit means and said selected spectrum line with said selected exit slit means, and servo means responsive to said signal for controlling the relations among and orientations of said entrance slit means, said diffraction grating means, said plurality of exit slit means and said selected slit means.

2. The spectroscopic apparatus of claim 1 wherein said selected spectrum line is the central image from said diffraction grating means.

References Cited in the file of this patent
UNITED STATES PATENTS 2,937,561    Saunderson et al. _____ May 24, 1960